United States Patent
Murota

(10) Patent No.: US 9,481,010 B2
(45) Date of Patent: Nov. 1, 2016

(54) METHOD FOR PRODUCING GAS BARRIER FILM

(71) Applicant: Konica Minolta, Inc., Tokyo (JP)

(72) Inventor: Kazutoshi Murota, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/398,580

(22) PCT Filed: Apr. 30, 2013

(86) PCT No.: PCT/JP2013/062662
§ 371 (c)(1),
(2) Date: Nov. 3, 2014

(87) PCT Pub. No.: WO2013/168647
PCT Pub. Date: Nov. 14, 2013

(65) Prior Publication Data
US 2015/0111046 A1    Apr. 23, 2015

(30) Foreign Application Priority Data
May 10, 2012 (JP) ................ 2012-108857

(51) Int. Cl.
| | | |
|---|---|---|
| *B05D 3/00* | (2006.01) | |
| *C08J 7/04* | (2006.01) | |
| *B32B 37/24* | (2006.01) | |
| *C08J 7/12* | (2006.01) | |
| *B05D 3/06* | (2006.01) | |
| *B05D 3/04* | (2006.01) | |
| *B05D 5/00* | (2006.01) | |
| *C09D 183/16* | (2006.01) | |
| *B32B 38/00* | (2006.01) | |
| *C08G 77/62* | (2006.01) | |

(52) U.S. Cl.
CPC ............. *B05D 3/002* (2013.01); *B05D 3/046* (2013.01); *B05D 3/067* (2013.01); *B05D 5/00* (2013.01); *B32B 37/24* (2013.01); *C08J 7/04* (2013.01); *C08J 7/123* (2013.01); *C09D 183/16* (2013.01); *B32B 2037/243* (2013.01); *B32B 2038/0092* (2013.01); *B32B 2310/0831* (2013.01); *B32B 2457/20* (2013.01); *B32B 2457/208* (2013.01); *C08G 77/62* (2013.01); *C08J 2383/04* (2013.01)

(58) Field of Classification Search
CPC ...... B05D 3/002; B05D 3/046; B05D 3/067; B05D 5/00; C09D 183/16
See application file for complete search history.

(56) References Cited

U.S. PATENT DOCUMENTS

| | | | | |
|---|---|---|---|---|
| 6,564,712 B2 * | 5/2003 | Sato | ............ | B41C 1/1091 101/462 |
| 8,617,708 B2 * | 12/2013 | Murakami | ............ | C08F 2/001 428/402 |
| 2001/0033921 A1 * | 10/2001 | Koyama | ............ | G03C 1/7954 428/216 |
| 2006/0264599 A1 * | 11/2006 | Anno | ............ | B29C 45/0001 528/272 |
| 2008/0032144 A1 * | 2/2008 | Hashimoto | ............ | C08J 5/18 428/480 |
| 2011/0209747 A1 * | 9/2011 | Shi | ............ | B29C 47/0021 136/251 |
| 2013/0146860 A1 * | 6/2013 | Toyama | ............ | H01L 51/0097 257/40 |

FOREIGN PATENT DOCUMENTS

| | | | | |
|---|---|---|---|---|
| JP | 2009255040 A | 11/2009 | | |
| JP | WO 2011049203 A1 * | 4/2011 | ............ | C08F 2/001 |
| JP | 2011-207018 A | 10/2011 | | |
| JP | WO 2012026362 A1 * | 3/2012 | ......... | H01L 51/0097 |
| JP | 2012-183823 A | 9/2012 | | |
| WO | WO2012/173040 A1 | 12/2012 | | |

OTHER PUBLICATIONS

Notification of Reasons for Refusal dated May 10, 2016; Application No./Patent No. 2014-514704; English translation of Notification of Reasons for Refusal dated May 10, 2016 total of 4 pages.

* cited by examiner

*Primary Examiner* — Elena T Lightfoot
(74) *Attorney, Agent, or Firm* — Lucas & Mercanti, LLP

(57) ABSTRACT

Provided is a method for producing a gas barrier film having a base and a gas barrier layer being arranged on the base, containing a step (1) for preparing a base having a moisture content of 0.01 to 1% by mass, a step (2) for obtaining a coating film by coating a coating liquid containing polysilazane onto the base, and a step (3) for forming a gas barrier layer by irradiating the coating film with vacuum ultraviolet rays.

16 Claims, No Drawings

METHOD FOR PRODUCING GAS BARRIER FILM

CROSS REFERENCE TO RELATED APPLICATION

This Application is a 371 of PCT/JP2013/062662 filed on Apr. 30, 2013 which, in turn, claimed the priority of Japanese Patent Application No. JP2012-108857 filed on May 10, 2012, both applications are incorporated herein by reference.

TECHNICAL FIELD

The present invention relates to a method for producing a gas barrier film.

BACKGROUND ART

Conventionally, a gas barrier film having a thin film (that is, gas barrier layer) containing metal oxide such as aluminum oxide, magnesium oxide, or silicon oxide formed on the surface of a plastic substrate or a film has been used for an application in packaging products in the field of food products, pharmaceutical products, or the like. By using a gas barrier film, degradation of a product caused by water vapor or gas like oxygen can be prevented.

Recently, a gas barrier film for preventing permeation of water vapor, oxygen, or the like is also used in the field of an electronic device such as a liquid crystal display (LCD) device, a photovoltaic (PV) cell, and an organic electroluminescence (EL). For an application of the gas barrier film to an electronic device, it is required to have flexibility, transparency, heat resistance, or the like. It is also required to have a high gas barrier property, for example, a gas barrier property comparable to a glass base.

As a method for producing such a gas barrier film, mainly, a method of forming a gas barrier layer on a base such as a film by a plasma CVD method (Chemical Vapor Deposition: chemical vapor phase growth method, chemical vapor deposition method) in which metal is vapor-deposited, a vacuum vapor deposition method in which metal is vaporized by using semiconductor laser or the like and deposited on a substrate in the presence of oxygen, a method of forming a gas barrier layer by sputtering, a method of forming a gas barrier layer by coating on a base a coating liquid that has polysilazane as the main component, and then performing a surface treatment, or a method using the above methods in combination, has been known.

However, in the gas barrier layer formed by these production methods, micropores may be generated due to the protrusion present on a base surface or due to the contamination by foreign substances in the gas barrier layer. Further, tiny cracks and the like may be generated due to the expansion and contraction of the gas barrier layer. Further, scratches may be caused by bending or contacting during handling, and the like. In a gas barrier layer in which these defects have been generated, gas may pass through the defect spots, and thus the gases cannot be completely cut off.

Under the circumstances, studies have been made on a gas barrier film having a high gas barrier property, which can be desirably used for an electronic device.

In Patent Literature 1, a gas barrier film having a resin base, a first silica film derived from polysilazane, which is formed by coating on the resin base followed by irradiation with ultraviolet rays having wavelength of 155 nm to 274 nm, and a second silica film derived from colloidal silica, which is laminated on the first silica film, is disclosed. According to Patent Literature 1, it is described that the gas barrier film has excellent water vapor permeability.

The method for producing the gas barrier film mentioned above includes, a step of forming a polysilazane layer by coating a polysilazane solution on a resin base followed by drying, a step of preparing a first silica film derived from polysilazane by irradiation of the polysilazane layer with ultraviolet rays with wavelength of 155 nm to 274 nm, a step of forming a colloidal silica layer by coating a colloidal silica solution on the first silica film, and a step of forming a second silica film by drying the colloidal silica layer. In Patent Literature 1, it is described that the production cost can be reduced and productivity can be improved with the method for producing a gas barrier film described above.

PRIOR ART DOCUMENTS

Patent Literature

Patent Literature 1: JP-A-2011-207018

SUMMARY OF INVENTION

However, it was found that the gas barrier film described in Patent Literature 1 does not necessarily have a sufficient gas barrier property when it is applied to an electronic device.

It was also found that the base is sometimes deformed during the process of producing a gas barrier film described in Patent Literature 1. Once the base is deformed, problems like peeling between abase and a gas barrier layer, or, when it is applied to an electronic device, problems in adhesion of a gas barrier film with other layer may arise.

It is also found that in the gas barrier film described in Patent Literature 1 the polysilazane layer is sometimes not converted entirely to a first silica film even with ultraviolet irradiation on the polysilazane layer (that is, unmodified portion remains). In that case, when the ratio of unmodified portion is large, a problem may arise in terms of stability over time. More specifically, under a high temperature and high humidity environment to which it is exposed at the time of application to an electronic device, impurities originating from the unmodified portion may be generated. In that case, when the gas barrier film is applied to an electronic device, it can exhibit a negative effect on the electronic device.

In view of the above, object of the present invention is to provide a means for producing a gas barrier film with an excellent gas barrier property. Another object of the present invention is to provide a means for suppressing deformation of a base during a process of producing a gas barrier film. Still another object of the present invention is to provide a means for producing a gas barrier film in which an occurrence of impurities is suppressed.

As a result of conducting intensive studies, the inventor of the present invention found that the aforementioned problems can be solved by using a base with pre-determined moisture content and forming a gas barrier layer by coating a coating liquid containing polysilazane on the base and irradiating with vacuum ultraviolet rays, and completed the present invention accordingly.

In other words, the aforementioned subject of the present invention is achieved by a means described below.

1. A method for producing a gas barrier film having a base and a gas barrier layer being arranged on the base, comprising: a step (1) for preparing a base having a moisture content of 0.01 to 1% by mass, a step (2) for obtaining a coating film by coating a coating liquid containing polysilazane onto the base, and a step (3) for forming a gas barrier layer by irradiating the coating film with vacuum ultraviolet rays;

2. The method according to 1, wherein a film thickness of the gas barrier layer is 50 to 600 nm; and 3. The method according to 1 or 2, wherein an accumulated light amount of the vacuum ultraviolet rays is 1000 to 10000 mJ/cm$^2$.

MODE FOR CARRYING OUT THE INVENTION

Hereinbelow, the embodiments for carrying out the present invention are explained in detail.

According to one embodiment of the present invention, a method for producing a gas barrier film having a base and a gas barrier layer being arranged on the base is provided. Herein, the production method includes a step (1) for preparing a base having the moisture content of 0.01 to 1% by mass, a step (2) for obtaining a coating film by coating a coating liquid containing polysilazane onto the base, and a step (3) for forming a gas barrier layer by irradiating the coating film with vacuum ultraviolet rays.

According to the present invention, a means for producing a gas barrier film with an excellent gas barrier property is provided.

According to the present invention, a means for suppressing deformation of a base during a process of producing a gas barrier film is also provided.

According to the present invention, a means for producing a gas barrier film in which an occurrence of impurities is suppressed is also provided.

<Step (1)>

The step (1) is a step for preparing a base having a moisture content of 0.01 to 1% by mass.

[Base]

The base which can be used for the present invention it not particularly limited, if it is a base in film form which has gas permeability and can maintain the gas barrier layer. However, it is preferably a film base that has flexibility and permeability and can be bent. Meanwhile, the expression "has gas permeability" referred to in the present invention means that the water vapor permeability measured based on K7129 of JIS standard (temperature 40° C., and relative humidity (RH) 90%) by using PERMATRAN-W3/33 (manufactured by MOCON) in accordance with a MOCON method is 0.5 g/m$^2$/day or more.

Specific examples of the base include, although not particularly limited, a resin film such as acrylic acid ester, methacrylic acid ester, polyethylene terephthalate (PET), polybutylene terephthalate (PBT), polyethylene naphthalate (PEN), polycarbonate (PC), polyarylate, polyvinyl chloride (PVC), polyethylene (PE), polypropylene (PP), polystyrene (PS), nylon (Ny), aromatic polyamide, polyether ether ketone, polysulfone, polyether sulfone (PES), polyimide (PI), or polyether imide (PEI); a heat-resistant transparent film in which silsesquioxane having an organic-inorganic hybrid structure is used as a basic skeleton (SILPLUS, manufactured by Nippon Steel Chemical Co., Ltd.); and also a transparent polyimide film (transparent polyimide-based film, type HM, manufactured by Toyobo Co., Ltd., and a transparent polyimide-based film, NEOPULIM L L-3430 manufactured by Mitsubishi Gas Chemical Company, Inc.) or the like. Among them, from the viewpoint of the cost and easy obtainability, it is preferable to use polyethylene terephthalate (PET), polybutylene terephthalate (PBT), polybutylene terephthalate (PBT), polyethylene naphthalate (PEN), polycarbonate (PC), cycloolefin copolymer (COC), or cycloolefin polymer (COP). Further, when a high temperature treatment is required during a processing step for sealing a device, it is preferable to use a transparent polyimide film from the viewpoint of heat resistance and transparency. Those bases can be used either alone or in combination of two or more kinds thereof.

Further, the base using the aforementioned resin film may be either a non-stretched film or a stretched film.

The base using the aforementioned resin film can be produced by a previously well-known general method. For example, by melting a resin using an extruder, and extruding the molten resin through a ring die or a T die followed by rapid cooling, a non-stretched film, which is substantially amorphous and is not oriented, can be produced. Furthermore, a stretched film can be produced by stretching the non-stretched film in a base-flowing direction (longitudinal direction) or a direction perpendicular to the base-flowing direction (lateral direction) by a well-known method such as uniaxial stretching, tenter type sequential biaxial stretching, tenter type simultaneous biaxial stretching, or tubular type simultaneous biaxial stretching. The stretching ratio in this case can be appropriately selected according to a resin as a raw material of the base, but it is preferably 2 times to 10 times in each of longitudinal and lateral directions. The stretched film can be also subjected to a relaxing treatment after stretching in order to improve the dimension stability of the base.

Thickness of the base used in the present invention is preferably 5 to 500 µm, and more preferably 25 to 250 µm.

Further, the base used in the present invention is preferably transparent. That is because, when the resin base is transparent, it is possible to prepare a transparent gas barrier film, and thus it can be applied to a substrate or the like of an electronic device such as an EL device.

The base used in the present invention preferably has the linear expansion coefficient of 50 ppm/° C. or less, and more preferably 1 to 50 ppm/° C. When the linear expansion coefficient of the base is 50 ppm/° C. or less, an occurrence of color deviation or deformation of the base caused by environmental temperature change can be suppressed when a gas barrier film is applied to an electronic device such as liquid display device (LCD panel), and therefore desirable. Meanwhile, the "linear expansion coefficient" as described herein uses the value that is measured by the following method. Specifically, by using a thermal stress-strain measuring device, EXSTAR TMA/SS6000 type (manufactured by Seiko Instruments Inc.), the base to be measured is heated from 30° C. to 50° C. at a rate of 5° C./minute under a nitrogen atmosphere, and then held temporarily at the same temperature. After that, it is heated to 30 to 150° C. again at a rate of 5° C./minute, and the change in size of the base is measured at elongation mode (load of 5 g). The linear expansion coefficient is obtained from the resulting value.

The total light transmittance of the base which is used in the present invention is preferably 90% or more. When the total light transmittance is 90% or more, high brightness can be obtained when the gas barrier film is applied to an electronic device such as a liquid crystal display device (LCD panel), and therefore desirable. Meanwhile, "total light transmittance" described herein means an average transmittance in the visible light region, which is obtained by measuring the total amount of transmitted light to the amount of incident light of visible light in accordance with ASTM D-1003 standard by using a spectrophotometer (ultraviolet visible spectrophotometer, UV-2500PC: manufactured by Shimadzu Corporation).

In addition, it is preferable that the base used in the present invention has 10-point average surface roughness Rz of 1 to 1500 nm, which is defined in JIS B 0601 (2001), and it is more preferably 5 to 400 nm. When the surface roughness Rz is within this range, the coatability of the coating liquid is improved, and therefore desirable. It is also possible that a single surface or both surfaces of the base, preferably a surface on which the barrier layer is formed, is polished to improve the smoothness, if necessary.

Further, it is also possible that the resin base of the present invention is treated with a corona treatment.

[Preparation of Base]

The base according to the present invention is characterized in that it has moisture content of 0.01 to 1% by mass, preferably 0.01 to 0.5% by mass, and more preferably 0.01 to 0.3% by mass. Although detailed explanations are given later, when the moisture content of the base is 0.01% by mass or more, an occurrence of impurities from the gas barrier film which is obtained by the production method of the present invention is suppressed, and therefore desirable. On the other hand, when the moisture content of the base is 1% by mass or less, the gas barrier film obtained by the production method of the present invention has an excellent gas barrier property and also the base deformation can be suppressed during the production process, and therefore desirable. Meanwhile, as described herein, the "moisture content" uses a value measured by coulometric titration using a Karl Fischer method. Specifically, the base (1 cm×5 cm) is fixed on a moisture meter CA-200 (manufactured by Mitsubishi Chemical Analytech Co., Ltd.) and the temperature of the device is raised from room temperature to 200° C. and maintained for 20 minutes. At that time, the moisture amount vaporized from the base is measured by coulometric titration using a Karl Fischer method.

When the moisture content of the prepared base is 0.01 to 1% by mass, the base can be directly used.

Meanwhile, when the moisture content of the prepared base is outside the range of 0.01 to 1% by mass, by adjusting the moisture content and obtaining a base which satisfies this pre-determined moisture content range, it can be said that a base with moisture content of 0.01 to 1% by mass is prepared.

With regard to a method for adjusting the moisture content of a base, a suitably known method can be employed. Specific examples thereof include, although not particularly limited, drying, immersion in water, and keeping in an environment with pre-determined humidity, or the like.

(Drying)

Drying is performed to lower the moisture content of abase. In general, by performing the drying when the moisture content of a base is more than 1% by mass, the moisture content of a base can be adjusted to the range of 0.01 to 1% by mass.

Method for drying is not particularly limited, and examples thereof include baking, drying under reduced pressure, and vacuum drying. Conditions for the drying can be determined with appropriate consideration of the desired moisture content, type of the base, coatability of a coating liquid containing polysilazane which is mentioned below, properties suitable for the gas barrier film to be obtained, or the like. For example, when the melting point of the base is low, because vapor pressure of water is 42 hPa at 30° C., by lowering the pressure to 42 hPa and heating to 30° C. approximately, the moisture content is lowered and a base having desired moisture content can be prepared.

(Impregnation in Water)

Impregnation in water is performed to increase the moisture content of a base. By performing the impregnation in water when the moisture content of a base is less than 0.01% by mass in general, the moisture content of a base can be adjusted to the range of 0.01 to 1% by mass.

Method for the impregnation in water is not particularly limited, and examples thereof include impregnation of a part or whole base in water. Conditions for the impregnation in water can be determined with appropriate consideration of the desired moisture content, type of the base, coatability of a coating liquid containing polysilazane which is mentioned below, properties suitable for the gas barrier film to be obtained, or the like. For example, when the base has a low water absorbing property, permeation of water into the base can be promoted by setting the water for impregnation at 25 to 60° C. approximately. Further, when the base has a high water absorbing property, by mixing water with a solvent having low boiling point (for example, an organic solvent which dissolves in water such as methanol or acetone), impregnating a base in the mixture solvent, and keeping it for a certain period of time at room temperature, a base with desired moisture content can be prepared.

(Keeping in Environment with Pre-Determined Humidity)

Keeping in an environment with pre-determined humidity is performed to decrease/increase the moisture content of abase. As such, keeping in an environment with pre-determined humidity can be performed for any case in which the moisture content of base is either higher or lower than the aforementioned range.

Method for keeping in an environment with pre-determined humidity is not particularly limited, and examples thereof include keeping a base in an environment in which constant temperature and humidity can be maintained. Conditions for keeping in an environment with pre-determined humidity can be determined with appropriate consideration of the desired moisture content, type of the base, coatability of a coating liquid containing polysilazane which is mentioned below, properties suitable for the gas barrier film to be obtained, or the like. For example, when the base has a low water absorbing property, by keeping it at 25 to 85° C. approximately with relative humidity (RH) of about 1 ppm to 90% for about 1 to 5 hours, a base having desired moisture content can be prepared.

[Intermediate Layer]

On the aforementioned base, other layer (intermediate layer) can be suitably formed between the base and the gas barrier layer. Examples of the intermediate layer include an anchor coat layer, a smooth layer, and a bleed out preventing layer. Meanwhile, since the intermediate layer has no gas barrier property (that is, water vapor permeates through it), the moisture content of a base can have an influence when the intermediate layer is formed.

(Anchor Coat Layer)

The anchor coat layer has a function of improving the adhesion between the base and the gas barrier layer and also providing high smoothness. The anchor coat layer can be formed by coating an anchor coating agent on a base, for example.

The anchor coating agent which can be used is not particularly limited, and examples thereof include polyester resins, isocyanate resins, urethane resins, acrylic resins, ethylene vinyl alcohol resins, modified vinyl resins, epoxy resins, modified styrene resins, modified silicone resins, and alkyl titanate. The anchor coating agent may be used either singly or in combination of two or more kinds thereof.

Further, into these anchor coating agents, a conventionally known additive, for example, a solvent and a diluent, can also be added.

Method for coating the anchor coating agent on a base is not particularly limited, and examples thereof include a roll coating method, a gravure coating method, a knife coating method, a dip coating method, and a spray coating method. The anchor coat layer can be formed by removing a solvent or a diluent, which may be included in the anchor coating agent coated on a base, by drying.

The anchor coating agent is preferably coated such that the coating amount is 0.1 to 5 g/m$^2$ in a dry state.

(Smooth Layer)

The smooth layer is generally formed on one surface of a base and has a function of smoothening a rough surface of a base on which tiny protrusions or the like are present and preventing an occurrence of irregularities or pin holes on a gas barrier layer which is formed as a film on a base. The smooth layer can be formed by coating a photosensitive resin composition on a base followed by curing.

The photosensitive resin composition generally contains a photosensitive resin, a photopolymerization initiator, and a solvent.

The photosensitive resin is not particularly limited if it is a photosensitive resin containing a reactive monomer which has at least one photopolymerizable unsaturated bond in the molecule. Examples thereof include a resin containing an acrylate compound having a radical reactive unsaturated bond, a resin containing an acrylate compound and a mercapto compound having a thiol group, and a resin containing a polyfunctional acrylate monomer such as epoxy acrylate, urethane acrylate, polyester acrylate, polyether acrylate, polyethylene glycol acrylate, or glycerol methacrylate. The resin may be used either singly or in combination of two or more kinds thereof.

The photopolymerization initiator is not particularly limited, and examples thereof include acetophenone, benzophenone, Michler's ketone, benzoin, benzyl methyl ketal, benzoin benzoate, hydroxy cyclohexyl phenyl ketone, 2-methyl-1-(4-(methylthio)phenyl)-2-(4-morpholinyl)-1-propane, α-acyloxime ester, and thioxanthones. The photopolymerization initiator may be used either singly or in combination of two or more kinds thereof.

The solvent is not particularly limited, and examples thereof include alcohols such as methanol, ethanol, propanol, isopropyl alcohol, ethylene glycol, and propylene glycol; terpenes such as α- or β-terpineol; ketones such as acetone, methyl ethyl ketone, cyclohexanone, N-methyl-2-pyrrolidone, diethyl ketone, 2-heptanone, and 4-heptanone; aromatic hydrocarbons such as toluene, xylene, and tetramethylbenzene; glycol ethers such as cellosolve, methyl cellosolve, ethyl cellosolve, carbitol, methyl carbitol, ethyl carbitol, butyl carbitol, diethylene glycol dimethyl ether, diethylene glycol diethyl ether, diethylene glycol dipropyl ether, propylene glycol monomethyl ether, propylene glycol monoethyl ether, dipropylene glycol monomethyl ether, dipropylene glycol monoethyl ether, dipropylene glycol dimethyl ether, dipropylene glycol diethyl ether, dipropylene glycol dipropyl ether, triethylene glycol monomethyl ether, and triethylene glycol monoethyl ether; esters such as ethyl acetate, butyl acetate, cellosolve acetate, ethyl cellosolve acetate, butyl cellosolve acetate, carbitol acetate, ethyl carbitol acetate, butyl carbitol acetate, propylene glycol monomethyl ether acetate, propylene glycol monoethyl ether acetate, 2-methoxyethyl acetate, cyclohexyl acetate, 2-ethoxyethyl acetate, 3-methoxy butyl acetate, 3-ethoxy ethyl propionate, and methyl benzoate: and amides such as N,N-dimethyl acetamide and N,N-dimethyl formamide. The solvent may be used either singly or in combination of two or more kinds thereof.

The photosensitive resin composition may be further added with, if necessary, an additive such as an antioxidant, an ultraviolet absorber, a plasticizer, inorganic particles, or a resin other than the photosensitive resin.

Of those, one preferred additive is particles of reactive silica in which a photosensitive group having photopolymerization reactivity is introduced onto the surface (hereafter, simply also referred to as "reactive silica particle"). The photosensitive group having photopolymerizability is not particularly limited, and examples include a polymerizable unsaturated group represented by a (meth)acryloyloxy group, and the like. According to a reaction between the photosensitive group having photopolymerizability which is contained in reactive silica particle and the polymerizable unsaturated group contained in a photosensitive resin, the adhesion to a gas barrier layer can be enhanced.

The reactive silica particle is not particularly limited, and it can be the one obtained by hydrolysis of a hydrolyzable silyl group contained in polymerizable unsaturated group-modified hydrolyzable silane to generate silica particles and a silyl oxy group, that is, a particle in which polymerizable unsaturated group-modified hydrolyzable silane is chemically bonded with silica particles. The hydrolyzable silyl group is not particularly limited, and examples thereof include an alkoxy silyl group; a carboxylate silyl group such as an acetoxy silyl group; a halogenated silyl group such as a chlorosilyl group; an aminosilyl group; an oximesilyl group; and a hydride silyl group. The polymerizable unsaturated group is not particularly limited, and examples thereof include an acryloyloxy group, a methacryloyloxy group, a vinyl group, a propenyl group, a butadienyl group, a styryl group, an ethynyl group, a cinnamoyl group, a maleate group, and an acrylamide group.

The average particle diameter of the reactive silica particle is preferably 0.001 to 0.1 μm, and more preferably 0.001 to 0.01 μm. As the reactive silica particle has the average particle diameter in the range described above and it is used in combination of a mattifying agent described below which may be contained in the photosensitive resin composition, an optical property that satisfies the anti-glare property and the resolution in well balance, and a hard coat property can be obtained.

When the reactive silica particle is contained in the photosensitive resin composition, the reactive silica particle is preferably contained at 20 to 60% by mass. When the reactive silica particle is contained at 20% by mass or more, the adhesion to a gas barrier layer can be enhanced, and therefore desirable. On the other hand, when the reactive silica particle is contained at 60% by mass or less, deformation of a film in an environment of high temperature and high humidity is suppressed and an occurrence of a crack accompanying it can be suppressed, and therefore desirable.

It is also preferable that the photosensitive resin composition contains a mattifying agent. By containing a mattifying agent, the optical property can be adjusted.

The mattifying agent is not particularly limited, and examples thereof which can be used include silica, alumina, talc, clay, calcium carbonate, magnesium carbonate, barium sulfate, aluminum hydroxide, titanium dioxide, and zirconium oxide. The mattifying agent can be used either singly or in combination of two or more kinds thereof.

The average particle diameter of the mattifying agent is preferably 0.1 to 10 μm, and more preferably 1 to 10 μm. As the mattifying agent has the average particle diameter in the range described above and it is used in combination of the aforementioned reactive silica particle which may be contained in the photosensitive resin composition, an optical property that satisfies the anti-glare property and the resolution in well balance, and a hard coat property can be obtained.

The content of the mattifying agent in the photosensitive resin composition is, relative to 100 parts by mass of the solid content of the photosensitive resin composition, preferably 2 to 20 parts by mass, more preferably 4 to 18 parts by mass, and more preferably 6 to 16 parts by mass.

Further, one preferred additive which may be contained in the photosensitive resin composition is a resin other than the photosensitive resin. The resin other than the photosensitive resin is not particularly limited, and examples thereof include a thermoplastic resin, a thermocurable resin, and an ionizing radiation curable resin.

Specific examples of the thermoplastic resin include cellulose derivatives such as acetyl cellulose, nitrocellulose, acetylbutyl cellulose, ethyl cellulose, and methyl cellulose; vinyl-based resins such as vinyl acetate, vinyl chloride, or vinylidene chloride, and a copolymer thereof; acetal-based resins such as polyvinyl formal, and polyvinyl butyral; acrylic-based resins such as an acrylic resin or a methacrylic resin, and a copolymer thereof; polystyrene-based resins; polyamide-based resins; linear polyester-based resins; and polycarbonate-based resins.

Specific examples of the thermocurable resin include thermosetting urethane resins consisting of acrylic polyol and an isocyanate prepolymer, phenolic resins, urea-melamine resins, epoxy resins, unsaturated polyester resins, and silicone resins.

As a specific example of the ionizing radiation curable resin, the one that can be cured by the irradiation of an ionizing radiation curable paint in which one kind alone or two or more kinds of photopolymerizable prepolymers, photopolymerizable monomers, and the like are mixed, with ionizing radiation (ultraviolet rays or electron rays), may be used. Herein, as the photopolymerizable prepolymer, an acrylic-based prepolymer that has two or more acryloyl groups in the molecule and forms a three dimensional network structure by cross-linking curing such as a urethane acrylate, a polyester acrylate, an epoxy acrylate, or a melamine acrylate is particularly preferable. Further, as the photopolymerizable monomer, the photosensitive resin described above, and the like can be used.

The method for coating the photosensitive resin composition on a base is not particularly limited, and examples thereof include a wet coating method such as a spin coating method, a spray coating method, a blade coating method, or a dipping method, or a dry coating method such as a vapor deposition method. The smooth layer can be formed by removing a solvent or the like that is contained in the photosensitive resin composition coated on the base by drying followed by curing.

For the curing, ionizing radiation can be used. As for the ionizing radiation, vacuum ultraviolet rays having a wavelength in a range of 100 to 400 nm and preferably 200 to 400 nm, which is emitted from an ultra-high pressure mercury lamp, a high pressure mercury lamp, a low pressure mercury lamp, a carbon arc, a metal halide lamp or the like, or electron beam having a wavelength in a range of 100 nm or less, which is emitted from a scan type or curtain type electron beam accelerator can be used.

The smoothness of the smooth layer is expressed by a value of the surface roughness defined in JIS B 0601: 2001, and the maximum cross-sectional height Rt (p) is preferably 10 to 30 nm. If the Rt is 10 nm or more, in the step (2) for forming a coating film by coating a coating liquid containing polysilazane onto the base described below, when the coating device is brought into contact with the surface of the smooth layer by a coating system of a wire bar, a wireless bar or the like, the stable coating properties can be obtained, and therefore desirable. Further, if the Rt is 30 nm or less, irregularities of the gas barrier layer that may be generated during the step described below can be smoothened, and therefore desirable.

The thickness of the smooth layer is not particularly limited, and it is preferably 1 to 10 μm, and more preferably 2 to 7 μm. If the thickness of the smooth layer is 1 μm or more, the function of the smooth layer can be sufficiently exhibited, and therefore desirable. On the other hand, if the thickness of the smooth layer is 10 μm or less, the balance of the optical properties of the gas barrier film can be adjusted and also curling of the gas barrier film can be suppressed, and therefore desirable.

(Bleed Out Preventing Layer)

The base having a smooth layer may have a contaminated base surface due to migration of an unreacted oligomer or the like from the inside to the surface of the base caused by heating. The bleed out preventing layer has a function of suppressing contamination of the surface of the base. The bleed out preventing layer is generally provided on a surface of the base having a smooth layer which is opposite to the surface on which the smooth layer is provided.

As long as the bleed out preventing layer has this function, it may have basically the same constitution as that of the smooth layer. Specifically, the bleed out preventing layer can be formed by coating a photosensitive resin composition on a base followed by curing.

The photosensitive resin composition generally contains a photosensitive resin, a photopolymerization initiator, and a solvent. As for the photosensitive resin, photopolymerization initiator, and solvent, those described above for the smooth layer can be also used. The photosensitive resin composition may be further added with an additive such as an antioxidant, an ultraviolet absorber, a plasticizer, inorganic particles, or a resin other than the photosensitive resin, as described above for the smooth layer.

Thus, various components are suitably mixed and added with a pre-determined solvent for dilution to prepare a coating liquid, and the resulting coating liquid is coated on a base according to a known coating method, for example. After that, according to curing by irradiation of ionizing radiation, the bleed out preventing layer can be formed.

The thickness of the bleed out preventing layer is preferably 1 to 10 μm, and more preferably 2 to 7 μm. If the thickness of the bleed out preventing layer is 1 μm or more, the heat resistance of the gas barrier film can be improved, and therefore desirable. On the other hand, if the thickness of the bleed out preventing layer is 10 μm or less, the optical properties of the gas barrier film can be suitably adjusted and also curling of the gas barrier film can be suppressed, and therefore desirable.

When at least one intermediate layer selected from a group consisting of the aforementioned anchor coat layer, smooth layer, and bleed out layer is formed on the base, the total thickness of the base and intermediate layer is preferably 5 to 500 μm, and more preferably 25 to 250 μm.

<Step (2)>

The step (2) is a step for obtaining a coating film by coating a coating liquid containing polysilazane (hereinbelow, also referred to as a "first coating liquid") onto the base prepared in the step (1).

Because the base having moisture content of pre-determined value as prepared in the step (1) may have fluctuating moisture content after keeping or the like, it is preferable that the step (2) is performed as soon as possible after the step (1).

[First Coating Liquid]

The first coating liquid contains polysilazane.

(Polysilazane)

The polysilazane is a polymer having a bond of Si—N, Si—H, N—H, and the like in the structure, and it functions as an inorganic precursor of $SiO_2$, $Si_3N_4$, and an intermediate solid solution $SiO_xN_y$ thereof, or the like.

The polysilazane is not particularly limited. However, taking into consideration of performing the modification treatment explained below, it is preferably a compound which is transformed into silica according to ceramization at relatively low temperature. It is preferably a compound having a main skeleton consisting of a unit represented by the following general formula (1) which is described in JP-A-8-112879, for example.

[Chem. 1]

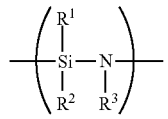

(1)

In the above general formula (1), each of $R^1$, $R^2$, and $R^3$ independently represents a hydrogen atom, an alkyl group, an alkenyl group, a cycloalkyl group, an aryl group, an alkylsilyl group, an alkylamino group, or an alkoxy group.

From the viewpoint of denseness of the gas barrier layer to be obtained, perhydropolysilazane (hereinbelow, also referred to as "PHPS") in which all of R', $R^2$, and $R^3$ represent a hydrogen atom is particularly preferred as polysilazane.

The structure of perhydropolysilazane has been believed to be a structure in which a straight chain structure and a cyclic structure of mainly six-membered ring and eight-membered ring exist. The molecular weight thereof is around 600 to 2000 in number average molecular weight (Mn) (in terms of polystyrene), and it can be a substance of a liquid or a solid (it varies depending on the molecular weight). Commercially available product of the perhydropolysilazane can be used and specific examples thereof include AQUAMICA NN120, NN110, NAX120, NAX110, NL120A, NL110A, NL150A, NP110, and NP140 (manufactured by AZ Electronic Materials).

Other examples of the polysilazane that is ceramized at a relatively low temperature include: silicon alkoxide added polysilazane obtained through a reaction of the polysilazane represented by the above-described general formula with silicon alkoxide (see, for example, JP-A-5-238827); glycidol added polysilazane obtained through a reaction with glycidol (see, for example, JP-A-6-122852); alcohol added polysilazane obtained through a reaction with alcohol (see, for example, JP-A-6-240208); metal carboxylate added polysilazane obtained through a reaction with metal carboxylate (see, for example, JP-A-6-299118); acetyl acetonate complex added polysilazane obtained through a reaction with acetyl acetonate complex containing metal (see, for example, JP-A-6-306329); metal particle added polysilazane obtained by adding metal particles (see, for example, JP-A-7-196986); and the like.

The polysilazane content in the first coating liquid varies depending on the film thickness of the intended gas barrier layer or the pot life of the coating liquid, however, it is preferably 0.2% by mass to 35% by mass relative to the total amount of the first coating liquid.

(Other Components)

The first coating liquid may additionally contain an amine catalyst, a metal catalyst, and a solvent.

Amine Catalyst and Metal Catalyst

The amine catalyst and metal catalyst can promote the conversion of polysilazane into a silicon oxide compound during the modification treatment described below.

The amine catalyst which can be used is not particularly limited, but examples thereof includes N, N-dimethylethanolamine, N,N-diethylethanolamine, triethanolamine, triethylamine, 3-morpholino propylamine, N,N,N',N'-tetramethyl-1,3-diaminopropane, and N,N,N',N'-tetramethyl-1,6-diaminohexane.

The metal catalyst which can be used is not particularly limited, but examples thereof include a platinum compound such as platinum acetyl acetonate, a palladium compound such as palladium propionate, and a rhodium compound such as rhodium acetyl acetonate.

The amine catalyst and metal catalyst are preferably contained at 0.1 to 10% by mass relative to the polysilazane. In particular, the amine catalyst is preferably contained at 0.5 to 5% by mass relative to the polysilazane from the viewpoint of enhancing the coatability and shortening of the reaction time.

Solvent

The solvent which may be contained in the first coating liquid is not particularly limited, if it does not react with polysilazane. Any known solvent can be used. Specific examples thereof include a hydrocarbon-based solvent such as aliphatic hydrocarbon, alicyclic hydrocarbon, aromatic hydrocarbon, and a halogenated hydrocarbon; and an ether-based solvent such as aliphatic ether and alicyclic ether. More specifically, examples of the hydrocarbon-based solvent include pentane, hexane, cyclohexane, toluene, xylene, solvesso, turpentine, methylene chloride, and trichloroethane. Examples of the ether-based solvent include dibutyl ether, dioxane, and tetrahydrofuran. The solvent can be used either singly or in a mixture of two or more kinds thereof.

[Formation of Coating Film]

By coating the first coating liquid onto a base, a coating film is obtained.

As a method for coating the first coating liquid, a suitable known method can be adopted. Examples of the coating method include a spin coating method, a roll coating method, a flow coating method, an ink jet method, a spray coating method, a printing method, a dip coating method, a flow cast method, a bar coating method, and a gravure coating method.

The coating amount of the first coating liquid is not particularly limited, and it can be suitably adjusted by considering the thickness of the gas barrier layer after drying.

It is preferable to dry the coating film after coating the first coating liquid. By drying the coating film, the organic solvent contained in the coating film can be removed. Although the entire organic solvent contained in the coating film can be removed, it is also possible to keep part of the solvent. Even when the organic solvent is partly remained, a desirable gas barrier layer can be obtained. Meanwhile, the remaining solvent can be removed during the step (3) or the like.

The temperature for drying the coating film varies depending on the base for application. However, it is preferably 50 to 200° C. For example, when a polyethylene terephthalate base having glass transition temperature (Tg) of 70° C. is used as a base, the drying temperature is preferably set at 150° C. or lower, considering deformation of the base caused by heat or the like. The temperature can be set by using a hot plate, an oven, a furnace, and the like. The drying time is preferably set at a short time, and, for example, when the drying temperature is 150° C., it is preferably set at 30 minutes or shorter. Further, the atmosphere for drying can be any one of under an air atmosphere, under a nitrogen atmosphere, under an argon atmosphere, under a vacuum, under reduced pressure in which oxygen concentration is controlled, and the like.

Further, from the viewpoint of obtaining an even coating film, an annealing can be performed.

The annealing temperature is not particularly limited, but it is preferably 60 to 200° C., and more preferably 70 to 160° C. The annealing temperature can be either constant or gradually changing. The temperature can be also continuously changed (that is, increasing the temperature and/or decreasing the temperature).

The annealing time is not particularly limited, but it is preferably 5 seconds to 24 hours, and more preferably 10 seconds to 2 hours.

According to one embodiment of the present invention, the gas barrier film produced by the production method of the present invention has an excellent gas barrier property as the moisture content of the base is 1% by mass or less. According to another embodiment of the present invention, deformation of the base can be suppressed during the production process as the moisture content of the base is 1% by mass or less.

With regard to the excellent gas barrier property, it is believed that prevention of the reaction between polysilazane and water by having the base moisture content of 1% by mass or less is one key factor. More specifically, the polysilazane in the coating film, which is obtained by coating the first coating liquid on a base, can form silanol (—SiOH) according to the reaction with moisture in the base. The polysilazane is modified by irradiation with vacuum ultraviolet rays in the step (3) that is described below, and it can accordingly exhibit the gas barrier property. However, if silanol is formed during the step for forming the coating film in the step (2), the modifiable area is reduced so that the gas barrier property can be deteriorated. It is believed for such reasons that, when the silanol formation is suppressed by having the base moisture content of 1% by mass or less, a gas barrier film with an excellent gas barrier property can be obtained. Meanwhile, the reaction between polysilazane and water during the step of coating the base tends to progress faster than the reaction between polysilazane in the first coating liquid and water which may be incorporated in the coating liquid. It is believed to be due to the reason that, as the area in which the coating film and the base are in contact is large, a state allowing an easy reaction between the polysilazane in the coating film and water in the base is yielded.

Further, with regard to the suppression of the deformation of the base, it is believed that lowering the migration of moisture between the base and coating film (or, migration via an intermediate layer depending on a case) by having the base moisture content of 1% by mass or less is one key factor. More specifically, when a coating film is formed on a base, moisture in the base may migrate to the coating film or moisture in the coating film may migrate to the base. As a result, accompanying the migration of moisture, volume of the base will change to cause deformation of the base. For such reasons, by having the base moisture content of 1% by mass or less, the migration of moisture between the base and coating film is lowered so that the deformation of the base can be suppressed.

<Step (3)>

The step (3) is a step for forming a gas barrier layer by irradiating the coating film obtained from the step (2) with vacuum ultraviolet rays.

[Irradiation with Vacuum Ultraviolet Rays]

According to irradiation of the coating film obtained from the step (2) with vacuum ultraviolet rays, the polysilazane constituting the coating film is modified to form a gas barrier layer. As described herein, the modification of polysilazane indicates conversion of polysilazane to a silicon oxide compound and/or a silicon oxynitride compound. Meanwhile, as described herein, the "vacuum ultraviolet rays" means ultraviolet rays with a wavelength of 10 to 200 nm including electromagnetic wave, and it is preferably 100 to 200 nm, and more preferably 100 to 180 nm.

For the modification treatment of polysilazane, that is, for forming silicon oxide and/or a silicon oxynitride based on substitution reaction of polysilazane, high temperature like 450° C. or more is generally required, and the modification treatment by heating is difficult to be applied to a case in which a resin film is used for a base. Accordingly, modification based on irradiation with vacuum ultraviolet rays, which allows a modification treatment at lower temperature, is applied. When polysilazane is irradiated with vacuum ultraviolet rays, the polysilazane is directly oxidized without being intermediated by silanol (that is, action of photons which is referred to as light quantum process), having little volume change during the oxidation process, and thus a silicon oxide film and/or a silicon oxynitride film having high density and little defect can be obtained. Further, with vacuum ultraviolet rays, ozone or active oxygen having high oxidizing ability is generated from oxygen or the like that are present in the reaction atmosphere, and the modification treatment of polysilazane can be also performed with the ozone or active oxygen. As a result, more dense silicon oxide film and/or silicon oxynitride film can be obtained. Accordingly, the gas barrier layer obtained by modification of polysilazane based on irradiation with vacuum ultraviolet rays can have a high barrier property.

The light source of vacuum ultraviolet rays is not particularly limited, and any known one can be used. For example, a low pressure mercury lamp and an excimer lamp can be mentioned. Among them, it is preferable to use an excimer lamp, in particular a xenon (Xe) excimer lamp.

The rare gas excimer lamp such as a xenon excimer lamp can irradiate vacuum ultraviolet rays. Because the rare gas atom such as Xe, Kr, Ar, and Ne has valence atoms in closed shell state, it is chemically very inert, and thus referred to as inert gas. However, an atom of rare gas, which has acquired energy by the discharge or the like (excited atom), can form a molecule by bonding with other atoms. For example, in the case where the rare gas is xenon, it is as follows.

$e + Xe \rightarrow Xe^*$ $Xe^* + 2Xe \rightarrow Xe_2^* + Xe$ $Xe_2^* \rightarrow Xe + Xe + h\nu(172\ nm)$ In that case, when the $Xe_2^*$ that is an excited excimer molecule is transmitted to the ground state, excimer light (vacuum ultraviolet rays) with a wavelength of 172 nm is emitted. The aforementioned excimer lamp utilizes the excimer light. As a method for obtaining excimer light, a method of using dielectric barrier discharge and a method of using electrodeless electric field discharge can be mentioned, for example. Meanwhile, the dielectric barrier discharge is very fine discharge called micro discharge that is similar to lightning occurring in a gas space, by the arrangement of the gas space between two electrodes via a dielectric body (transparent quartz in the case of an excimer lamp), and by the application of high voltage with a high frequency of several tens of kHz to electrodes. Further, the electrodeless electric field discharge is electrodeless electric field discharge based on capacitive coupling, and is also called RF discharge as another name. Specifically, it is spatially and timely uniform discharge that is generated when a lamp, electrodes, or the like are also arranged like those in the dielectric barrier discharge, and high frequency voltage of several MHz is applied to the electrode.

Because the excimer lamp has a characteristic that the excimer light is concentrated on one wavelength so as to radiate almost no light other than required light, it has high efficiency. Further, as no extra light is radiated, temperature of the subject can be maintained at low level. Further, as it requires no time for initiation and re-initiation, it is possible to have instant lighting and extinguishing. In particular, the Xe excimer lamp radiates vacuum ultraviolet rays with single wavelength, that is, short wavelength of 172 nm, and thus the radiation efficiency is excellent. Because the Xe excimer lamp has short wavelength of 172 nm and high energy, it is known to have a high ability of degrading bonds in an organic compound. Further, as the Xe excimer lamp has high oxygen absorption coefficient, it can generate efficiently the active oxygen or ozone from even a trace amount of oxygen. For example, compared to a low pressure mercury lamp radiating vacuum ultraviolet rays at wavelength of 185 nm, the Xe excimer lamp has a high ability of degrading the bonds in an organic compound and can generate efficiently the active oxygen or ozone, and thus the modification treatment of polysilazane can be performed at low temperature and also in short time. Further, because the Xe excimer lamp has high efficiency of light generation, instant lighting and extinguishing light at low power is possible and can emit light with single wavelength, and thus it is desirable from the economic viewpoint of shortening the process time accompanying high throughput and reducing an area for facilities and also from the viewpoint of applying to a gas barrier film in which a base easily susceptible to damages caused by heat is used.

As described above, the excimer lamp has high efficiency for light generation, and thus lighting can be obtained at low power and also the increase in surface temperature of an irradiation subject can be suppressed. Further, as the number of photons that enter the inside is also increased, it is possible that the increase in modified film thickness and/or the increased density in film property can be obtained.

With regard to the conditions for irradiation with vacuum ultraviolet rays, the conversion reaction is generally determined by having as an indicator an integrated light amount that is represented as a product between irradiation intensity and irradiation time. However, when materials having the same composition but with various structural forms, such as silicon oxide, are used, sometimes the absolute value of the irradiation intensity may become important.

The irradiation intensity of vacuum ultraviolet rays may vary depending on the base to be used or composition, concentration, or the like of the polysilazane layer. However, it is preferably 1 mW/cm$^2$ to 100 kW/cm$^2$ and more preferably 1 mW/cm$^2$ to 10 W/cm$^2$.

Irradiation time for the irradiation with vacuum ultraviolet rays may vary depending on the base to be used, or composition, concentration, or the like of the polysilazane layer. However, it is preferably 0.1 second to 10 minutes, and preferably 0.5 second to 3 minutes.

Further, the accumulated light amount of the vacuum ultraviolet rays is not particularly limited, but it is preferably 1000 to 10000 mJ/cm$^2$, and more preferably 1000 to 5000 mJ/cm$^2$. If the accumulated light amount of vacuum ultraviolet rays is 1000 mJ/cm$^2$ or more, a high barrier property can be obtained as the modification can be performed sufficiently and therefore desirable. On the other hand, if the accumulated light amount of the vacuum ultraviolet rays is 10000 mJ/cm$^2$ or less, a gas barrier layer with high smoothness can be formed without the base deformation, and therefore desirable.

In addition, the temperature for irradiation with vacuum ultraviolet rays may vary depending on the base for application, and it may be suitably determined by a person skilled in the art. The temperature for irradiation with vacuum ultraviolet rays is preferably 50 to 200° C., and more preferably 80 to 150° C. When the irradiation temperature is within this range, it is difficult to have an occurrence of deformation, deterioration of the strength, or the like of the base and the characteristics of the base are not impaired, and therefore desirable.

Further, the atmosphere for irradiation with vacuum ultraviolet rays is not particularly limited. However, from the viewpoint of performing efficiently the modification by generating active oxygen or ozone, it is preferably performed in an atmosphere containing oxygen. Oxygen concentration for the vacuum ultraviolet irradiation is preferably 300 to 10000 ppm (1%), and more preferably 500 to 5000 ppm. When the oxygen concentration is 500 ppm or higher, the modification efficiency is enhanced, and therefore desirable. On the other hand, when the oxygen concentration is 10000 ppm or less, the time for substitution between air and oxygen can be shortened, and therefore desirable.

The coating film as a subject for ultraviolet irradiation includes oxygen and a trace amount of water that are incorporated therein during the coating, and also adsorbed oxygen or adsorbed water may be present on the base or neighboring layer, or the like. By using the oxygen or the like, the oxygen source required for generation of active oxygen or ozone for performing the modification treatment may be sufficient even when no oxygen is newly introduced to the irradiation chamber. Further, as vacuum ultraviolet rays of 172 nm like a Xe excimer lamp is absorbed by oxygen, there can be a case in which the amount of vacuum ultraviolet rays reaching the coating film is decreased. Thus, for irradiation with vacuum ultraviolet rays, it is preferable to set at a low oxygen concentration and have a condition for allowing efficient delivery of vacuum ultraviolet rays to the coating film.

Gas other than oxygen in the atmosphere for irradiation with vacuum ultraviolet rays is preferably a dry inert gas. From the viewpoint of cost, it is more preferable to use dry nitrogen gas. Meanwhile, the oxygen concentration can be adjusted by measuring the flow rate of the gases such as oxygen gas or inert gas that are introduced to the irradiation chamber and changing the ratio of the flow rate.

The generated vacuum ultraviolet rays can be, after reflecting the vacuum ultraviolet rays from the generation source by a reflector, irradiated onto the polysilazane layer before modification, from the viewpoint of enhancing the irradiation efficiency and achieving even irradiation. Further, the vacuum ultraviolet irradiation can be applied to a batch processing and also to a continuous processing, and thus the processing can appropriately be selected depending on the shape of the base to be used. For example, in the case in which the base is in the shape of a long-length film, the modification is preferably performed by irradiating continuously the vacuum ultraviolet rays while conveying the base.

The film thickness, density of the like of the gas barrier layer obtained by the aforementioned modification treatment can be controlled by suitably selecting conditions for coating or conditions for irradiation with vacuum ultraviolet rays. For example, by suitably selecting a method of irradiating ultraviolet rays from continuous irradiation, irradiation with several divided irradiations, or so-called pulse irradiation in which several irradiations are performed for a short time, the film thickness or density of the gas barrier layer can be controlled.

With regard to the level of the modification treatment, according to XPS surface analysis of the formed functional inorganic layer, determination can be made by obtaining compositional ratio of each atom including a silicon (Si) atom, a nitrogen (N) atom, and an oxygen (O) atom.

According to one embodiment of the present invention, by having the base moisture content of 0.01% by mass or more, generation of impurities from the gas barrier film, which is obtained by the production method of the present invention, can be suppressed as described above.

With regard to suppressed generation of impurities, it is believed that reducing unmodified polysilazane during the modification of polysilazane by irradiation of a coating film with vacuum ultraviolet rays by having the base moisture content of 0.01% by mass or more is one key factor.

More specifically, when the coating film obtained in the step (2) is irradiated with vacuum ultraviolet rays, conversion or cross-linking may occur first in a surface area of a coating film to which vacuum ultraviolet rays are irradiated first. As a result, vacuum ultraviolet rays cannot reach the inside of the coating film with the energy maintained at a high level, due to curing of the coating film in the surface area. Thus, a gas barrier film having unmodified polysilazane remained inside the coating film can be obtained. When a gas barrier film containing residual polysilazane is used, impurities (mainly, ammonia gas) can be generated over time, due to a reaction with water (water vapor) which may penetrate the inside of the coating film, in particular, under a high temperature and high humidity environment to which it is exposed to an application for an electronic device. More specifically, ammonia gas may be generated according to the following reaction formula.

[Chem. 2]

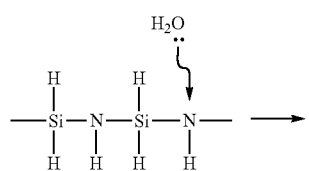

-continued

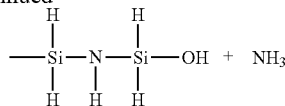

With the ammonia gas which is generated like above, air bubbles are generated and the gas barrier film may deteriorate over time.

However, as the moisture content of the base is 0.01% by mass or more according to this embodiment, water is supplied from the base and the above reaction can occur when irradiation with vacuum ultraviolet rays is made (meanwhile, on a surface layer, the conversion or the like progresses at relatively early stage, and thus it is difficult to have water supplied from the surface layer side at the time of irradiation with vacuum ultraviolet rays). In other words, the reaction which can be initiated over time by unmodified polysilazane is forced to occur during the production process. As a result, because the polysilazane not modified inside the gas barrier layer can react with water, the amount of unmodified polysilazane inside the obtained gas barrier layer can be reduced. Accordingly, the obtained gas barrier film can have a suppressed occurrence of impurities which may be generated over time.

[Gas Barrier Layer]

The gas barrier layer formed by the step (3) has a function of providing the gas barrier film with a gas barrier property. Meanwhile, as described herein, the "gas barrier property" indicates that the water vapor permeability (temperature: 60±0.5° C., and relative humidity (RH): 90±2%) measured according to the method based on JIS K 7129-1992 is $3 \times 10^{-3}$ g/(m²·24 h) or less and the oxygen permeability measured according to the method based on JIS K 7126-1987 is $1 \times 10^{-3}$ mL/m²·24 h·atm or less.

The gas barrier layer can be either a monolayer or a laminate of two or more layers, but it is preferably a laminate of two or more layers from the viewpoint of having even higher gas barrier property. The reason is that, with the gas barrier layer obtained by laminating two or more layers, as a result of repeating the step (2) and the step (3), tiny defects which may occur in part of the first gas barrier layer can be fixed by the second gas barrier layer. Meanwhile, when two or more layers are laminated, each layer may consist of the same component or it may be a layer consisting of different component. Further, the gas barrier layer may be formed on both surfaces of the base.

The thickness of the gas barrier layer is preferably 1 nm to 10 μm, more preferably 2 nm to 1 μm, and even more preferably 50 to 600 nm. When the gas barrier layer is 1 nm or more, it becomes possible to have a sufficient gas barrier property, and therefore desirable. On the other hand, when the gas barrier layer is 10 μm or less, it is unlikely for the gas barrier layer to have cracks, and therefore desirable. Meanwhile, when the gas barrier layer is obtained by laminating two or more layers, the total film thickness is preferably within the aforementioned range. Further, when the gas barrier layer is formed on both surfaces, thickness of each film is preferably within the aforementioned range.

<Step (4)>

According to one embodiment, the method for producing a gas barrier film may further includes the step (4) for forming a protective layer. The step (4) is a step for obtaining a protective layer by coating a coating liquid containing polysiloxane (hereinbelow, also referred to as the "second coating liquid") on a gas barrier film obtained in the step (3).

[Second Coating Liquid]

The second coating liquid contains polysiloxane.

(Polysiloxane)

Polysiloxane is not particularly limited, and any known one can be used. Among them, the organopolysiloxane represented by the following general formula (2) is preferably used.

[Chem. 3]

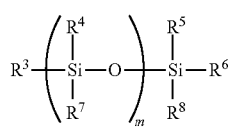

(2)

In the above general formula (2), each of $R^3$ to $R^8$ independently represents a C1 to C8 organic group, in which at least one of $R^3$ to $R^8$ is an alkoxy group or a hydroxyl group and m is an integer of 1 or higher. Examples of the C1 to C8 organic group include, although not particularly limited, a halogenated alkyl group such as γ-chloropropyl group, and 3,3,3-trifluoropropyl group; an alkenyl group such as vinyl group; an aryl group such as phenyl group; a (meth)acrylic acid ester group such as γ-methacryloxypropyl group; an epoxy-containing alkyl group such as γ-glycidoxypropyl group; a mercapto-containing alkyl group such as γ-mercaptopropyl group; an aminoalkyl group such as γ-aminopropyl group; an isocyanate-containing alkyl group such as γ-isocyanatepropyl group; a straight or branched alkyl group such as methyl group, ethyl group, propyl group, and isopropyl group; an alicyclic alkyl group such as cyclohexyl group, and cyclopentyl group; a straight or branched alkoxy group such as methoxy group, ethoxy group, propoxy group, and isopropoxy group; and an acyl group such as acetyl group, propionyl group, butyryl group, valeryl group, and caproyl group.

Among the organopolysiloxanes represented by the above general formula (2), it is more preferable to use organopolysiloxane in which m is 1 or more, and a weight average molecular weight is 1000 to 20000 in terms of polystyrene. If the weight average molecular weight of the organopolysiloxane is 1000 or more, cracks hardly occur in the protective layer to be formed and the gas barrier property can be maintained, and therefore desirable. On the other hand, if the weight average molecular weight of the organopolysiloxane is 20000 or less, curing of the protective layer to be formed becomes sufficient and sufficient hardness can be obtained for the protective layer, and therefore desirable.

(Other Components)

The second coating liquid may additionally contain a solvent or a suitably known component.

Solvent

Examples of the solvent which can be contained in the second coating liquid include, although not particularly limited, water, an alcohol-based solvent, an aromatic hydrocarbon-based solvent, an ether-based solvent, a ketone-based solvent, and an ester-based solvent. Examples of the alcohol-based solvent include methanol, ethanol, n-propyl alcohol, isopropyl alcohol, n-butyl alcohol, sec-butyl alcohol, tert-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol, methyl cellosolve, ethyl cellosolve, propyl cellosolve, and butyl cellosolve. Examples of the aromatic hydrocarbon-based solvent include toluene and xylene. Examples of the ether-based solvent include tetrahydrofuran, 1,4-dioxane, and 1,2-dimethoxyethane. Examples of the ketone-based solvent include cyclohexanone, acetone, methyl ethyl ketone, and methyl isobutyl ketone. Examples of the ester-based solvent include methyl acetate, ethyl acetate, and ethoxyethyl acetate. In addition to them, a solvent like dichloroethane and acetic acid can be used. The solvent can be used either singly or in combination of two or more kinds thereof.

Known Components

Examples of the known components include an aminosilane compound, an epoxysilane compound, colloidal silica, and a curing catalyst.

[Formation of Protective Layer]

The protective layer is obtained by coating the second coating liquid on a gas barrier layer.

As for the method for coating the second coating liquid, a suitable wet coating method which is conventionally known can be used. Specific examples thereof include a spin coating method, a dipping method, a roller blade method, and a spraying method.

The coating amount of the second coating liquid is not particularly limited, and it can be suitably adjusted by considering the thickness of the gas barrier layer after drying.

It is preferable to dry the coating film after coating the second coating liquid. By drying the coating film, the organic solvent contained in the coating film can be removed. Although the entire organic solvent contained in the coating film can be removed, it is also possible to keep part of the organic solvent. Even when the organic solvent is partly remained, a desirable protective layer can be obtained. As for the drying method, the same method as the step (2) can be applied.

It is also possible to perform further irradiation of the coating film obtained as above with vacuum ultraviolet rays to have the modified polysiloxane and use it as a protective layer. As for the irradiation with vacuum ultraviolet rays, the same method as the above step (3) can be used, and the conditions for irradiation can be suitably set depending on the desired performances. Meanwhile, specific composition of the polysiloxane obtained by the modification remains unclear.

[Protective Layer]

The protective layer includes polysiloxane and/or a product obtained by modification of polysiloxane.

The protective layer can be either a monolayer or a laminate of two or more layers. When two or more layers are laminated, each layer may consist of the same component or different components.

The thickness of the protective layer can be suitably determined based on the desired performances. For example, the thickness of the protective layer is preferably 100 nm to 10 μm, and more preferably 50 nm to 1 μm. If the thickness of the protective layer is 100 nm or more, a sufficient barrier property can be obtained, and therefore desirable. On the other hand, when the thickness of the protective layer is 10 μm or less, high light transmittance can be achieved and also stable coating can be obtained during formation of the protective layer, and therefore desirable.

The film density of the protective layer is preferably 0.35 to 1.2 g/cm$^3$, more preferably 0.4 to 1.1 g/cm$^3$, and even more preferably 0.5 to 1.0 g/cm$^3$. If the film density is 0.35 g/cm$^3$ or more, sufficient mechanical strength of the coated film can be obtained, and therefore desirable. On the other hand, if the film density is 1.2 g/cm$^3$ or less, it is unlikely to have an occurrence of cracks in the protective layer, and therefore desirable.

<Electronic Device>

According to one embodiment of the present invention, an electronic device including a main body of an electronic device and the gas barrier film prepared by the production method described above is provided.

[Main Body of Electronic Device]

The main body of an electronic device is not particularly limited, and a known main body of an electronic device to which a gas barrier film can be applied can be mentioned. Examples thereof include a photovoltaic (PV) cell, a liquid crystal display (LCD) device, and an organic electroluminescence (EL) device. Constitution of the main body of an electronic device is not particularly limited either, and it may have a known constitution. For example, an organic EL device can have a substrate, a negative electrode, an electron injection layer, an electron transport layer, a light emitting layer, a hole transport layer, a hole injection layer, a positive electrode, or the like.

[Gas Barrier Film]

The gas barrier film prepared according to the aforementioned method can be used as a base, a sealing material, or the like. When it is used as a base, for example, for a photovoltaic cell, it can be used as a resin support in which a transparent conductive thin film like ITO is formed as a transparent electrode on a gas barrier film. In that case, the gas barrier film is incorporated into the main body of an electronic device. Further, when it is used as a sealing material, an electronic device with sealed liquid crystal display device can be obtained. The gas barrier film according to the present invention is preferably used, as a sealing material, for sealing of a main body of an electronic device.

<Method for Producing Electronic Device>

An electronic device including a main body of an electronic device and a gas barrier film can be suitably produced with reference to known methods without being particularly limited.

EXAMPLES

Hereinbelow, the present invention is explained in detail in view of the examples. However, the present invention is not limited to them. Meanwhile, in the examples, description of "parts" and "%" are used, and they indicate "parts by mass" and "% by mass", respectively, unless specifically described otherwise.

[Preparation of Gas Barrier Film]

Example 1

Step (1)

As a base, TORAYFAN 2500H (manufactured by Toray Industries, Inc.), which is a polypropylene (PP) film with thickness of 50 µm, was prepared. The base was kept for 24 hours in an environment of 25° C. and 50% RH to remove moisture, and then the moisture content of the base was measured as follows. Immediately thereafter, the step (2) was performed.

Measurement of Moisture Content

The base was cut to a size of 1 cm×5 cm. The base was kept in an apparatus for measuring moisture, that is, CA-200 (manufactured by Mitsubishi Chemical Analytech Co., Ltd.). Temperature of the apparatus was increased from room temperature to 200° C. and maintained for 20 minutes at 200° C. The amount of moisture vaporized from the base was measured by coulometric titration using a Karl Fischer method. As a result, the moisture content of the base was found to be 0.012% by mass.

Step (2)

By mixing a dibutyl ether solution containing 20% by mass of catalyst-free perhydropolysilazane (AQUAMICA NN 120-20 manufactured by AZ Electronic Materials) and a dibutyl ether solution containing 5% by mass (solid content) of an amine catalyst (N,N,N',N'-tetramethyl-1,6-diaminohexane) (that is, AQUAMICA NAX120-20 manufactured by AZ Electronic Materials), a first coating liquid was prepared. In the first coating liquid obtained, the amine catalyst was 1% by mass (solid content).

By using a spin coater, the first coating liquid prepared from above was coated on top of the base such that the film thickness after drying is 200 nm. By drying at 100° C. for 2 minutes, a coating film was obtained.

Step (3)

The coating film obtained from the above step (2) was irradiated with vacuum ultraviolet rays to form a gas barrier layer. As a result, a gas barrier film was produced. Meanwhile, the vacuum ultraviolet rays irradiation was performed by using an excimer irradiation device MODEL: MECL-M-1-200 manufactured by M.D. Com) with the conditions including wavelength of 172 nm, stage temperature of 100° C., and accumulated light amount of 5000 mJ/cm$^2$.

Example 2

Step (1)

As a base, PURE-ACE (manufactured by Teijin Kasei Corp.), which is a polycarbonate (PC) with thickness of 100 µm, was prepared. The base was baked for 10 minutes at 90° C., and then the moisture content of the base was measured in the same manner as Example 1. As a result, the moisture content of the base was found to be 0.1% by mass.

Step (2) and Step (3)

The gas barrier film was prepared in the same manner as Example 1 except that the first coating liquid is coated in the step (2) to have film thickness of 40 nm after drying.

Example 3

The gas barrier film was prepared in the same manner as Example 2 except that the first coating liquid is coated in the step (2) to have film thickness of 80 nm after drying.

Example 4

The gas barrier film was prepared in the same manner as Example 2 except that the first coating liquid is coated in the step (2) to have film thickness of 200 nm after drying and the accumulated light amount of vacuum ultraviolet ray irradiation is changed to 500 mJ/cm² in the step (3).

Example 5

The gas barrier film was prepared in the same manner as Example 4 except that the accumulated light amount of vacuum ultraviolet ray irradiation is changed to 1000 mJ/cm² in the step (3).

Example 6

The gas barrier film was prepared in the same manner as Example 4 except that the accumulated light amount of vacuum ultraviolet ray irradiation is changed to 5000 mJ/cm² in the step (3).

Example 7

The gas barrier film was prepared in the same manner as Example 4 except that the accumulated light amount of vacuum ultraviolet ray irradiation is changed to 10000 mJ/cm² in the step (3).

Example 8

The gas barrier film was prepared in the same manner as Example 4 except that the accumulated light amount of vacuum ultraviolet ray irradiation is changed to 15000 mJ/cm² in the step (3).

Example 9

The gas barrier film was prepared in the same manner as Example 6 except that the first coating liquid is coated in the step (2) to have film thickness of 600 nm after drying.

Example 10

The gas barrier film was prepared in the same manner as Example 6 except that the first coating liquid is coated in the step (2) to have film thickness of 800 nm after drying.

Example 11

Step (1)

As a base, TEFLEX FT7 (manufactured by Teijin DuPont Corp.), which is polyethylene terephthalate (PET) with thickness of 100 μm, was prepared. The base was baked for 1 minute at 100° C., and then the moisture content of the base was measured in the same manner as Example 1. As a result, the moisture content of the base was found to be 0.3% by mass.

Step (2) and Step (3)

The gas barrier film was prepared in the same manner as Example 6.

Example 12

Step (1)

As a base, TEONEX (manufactured by Teijin DuPont Corp.), which is polyethylene naphthalate (PEN) with thickness of 100 μm, was prepared. The base was baked for 1 minute at 100° C., and then the moisture content of the base was measured in the same manner as Example 1. As a result, the moisture content of the base was found to be 0.3% by mass.

Step (2) and Step (3)

The gas barrier film was prepared in the same manner as Example 6.

Example 13

Step (1)

As a base, PURE-ACE (manufactured by Teijin Kasei Corp.), which is a polycarbonate (PC) with thickness of 100 μm, was prepared. The entire base was immersed in water for 24 hours at room temperature (25° C.), and then the moisture content of the base was measured in the same manner as Example 1. As a result, the moisture content of the base was found to be 0.4% by mass.

Step (2) and Step (3)

The gas barrier film was prepared in the same manner as Example 6.

Example 14

Step (1)

As a base, RAYFAN (manufactured by Toray Industries, Inc.), which is a polyacrylamide (PA) with thickness of 50 μm, was prepared. The base was baked for 4 hours at 80° C., and then the moisture content of the base was measured in the same manner as Example 1. As a result, the moisture content of the base was found to be 0.8% by mass.

Step (2) and Step (3)

The gas barrier film was prepared in the same manner as Example 6.

Comparative Example 1

Step (1)

As a base, TORAYFAN 2500H (manufactured by Toray Industries, Inc.), which is a polypropylene (PP) with thickness of 50 μm, was prepared. The base was kept for 24 hours in an environment of 25° C. and 5% RH, and then the moisture content of the base was measured in the same manner as Example 1. As a result, the moisture content of the base was found to be 0.008% by mass.

Step (2) and Step (3)

The gas barrier film was prepared in the same manner as Example 6.

Comparative Example 2

Step (1)

As a base, PURE-ACE (manufactured by Teijin Kasei Corp.), which is a polycarbonate (PC) with thickness of 100 μm, was prepared. The base was baked for 4 hours at 90° C., and then the moisture content of the base was measured in the same manner as Example 1. As a result, the moisture content of the base was found to be 0.009% by mass.

Step (2) and Step (3)

The gas barrier film was prepared in the same manner as Example 6.

Comparative Example 3

Step (1)

As a base, RAYFAN (manufactured by Toray Industries, Inc.), which is a polyacrylamide (PA) with thickness of 50 μm, was prepared. The base was kept for 24 hours in an environment of 25° C. and 50% RH, and then the moisture content of the base was measured in the same manner as Example 1. As a result, the moisture content of the base was found to be 1.4% by mass.

Step (2) and Step (3)

The gas barrier film was prepared in the same manner as Example 6.

[Evaluation of Gas Barrier Film]

The following evaluation was performed for each gas barrier film which has been obtained from Examples and Comparative Examples.

(Evaluation of Water Vapor Barrier Property)

By using a vacuum vapor deposition apparatus JEE-400 (manufactured by JEOL Ltd.), on the surface of a gas barrier layer of the gas barrier film prepared above, metal calcium (particulate state), which is a metal that can be corroded by a reaction with moisture, was deposited in a size of 12 mm×12 mm via a mask. Thereafter, the mask was removed while kept in the vacuum state and metal aluminum (ϕ3 to 5 mm, particulate state), which is a metal impermeable to water vapor, was deposited on the whole surface on one side of a sheet to temporarily seal the surface. Subsequently, the vacuum state was removed and the resultant sheet was promptly transferred into a dry nitrogen gas atmosphere. Then, a quartz glass having a thickness of 0.2 mm was bonded on the vapor deposited aluminum surface, which has been temporarily sealed above, via an ultraviolet curable resin (manufactured by Nagase ChemteX Corporation), the resultant sheet was irradiated with ultraviolet rays, and cured the ultraviolet curable resin for complete sealing, and thus a sample for water vapor barrier property evaluation was prepared.

The resultant sample for water vapor barrier property evaluation was stored at high temperature and high humidity of 60° C., 90% RH by using Yamato Humidic Chamber IG 47 M, which is a constant-temperature and constant-humidity oven. The corroded area of metal calcium after 20 hours relative to the vapor deposition area of metal calcium of 12 mm×12 mm was obtained as percentage (%), and the water vapor barrier property was evaluated according to the following criteria.

◯: the area in which the metal calcium had corroded was less than 1.0%

Δ: the area in which the metal calcium had corroded was 1.0% or more but less than 5.0% x: the area in which the metal calcium had corroded was 5.0% or more.

The obtained results are listed in Table 1 below.

(Evaluation of Base Deformation)

The gas barrier film with a size of 10 cm×10 cm was kept in a flat place. Among the positions at which the base of the gas barrier film is in the air (that is, it is not contact with the place for keeping), the height in perpendicular direction was measured for the position with the highest length. Then, the degree of base deformation was evaluated according to the following criteria.

◯: the measured value was less than 5 mm

Δ: the measured value was 5 mm or more but less than 10 mm x: the measured value was 10 mm or more.

The obtained results are listed in Table 1 below.

(Evaluation of Malodor)

Within an hour after the production, the gas barrier film with a size of 19 cm×29 cm was added to an aluminum pouch which has a volume of 600 cm$^3$ (LAMIZIP, manufactured by AS ONE Corporation). After keeping it for 3 days at 60° C., the malodor at the time of opening was evaluated according to the following criteria.

◯: There was no feeling of ammonia odor x: There was feeling of ammonia odor.

The obtained results are listed in Table 1.

TABLE 1

| | | Base | Gas barrier layer | | | | |
|---|---|---|---|---|---|---|---|
| | Resin | Moisture content (% by mass) | Film thickness (mm) | Accumulated light amount (mJ/cm$^2$) | Water vapor barrier property | Base deformation | Malodor |
| Example 1 | PP | 0.012 | 200 | 5000 | ◯ | ◯ | ◯ |
| Example 2 | PC | 0.2 | 40 | 5000 | Δ | ◯ | ◯ |
| Example 3 | PC | 0.2 | 80 | 5000 | ◯ | ◯ | ◯ |
| Example 4 | PC | 0.2 | 200 | 500 | Δ | ◯ | ◯ |
| Example 5 | PC | 0.2 | 200 | 1000 | ◯ | ◯ | ◯ |
| Example 6 | PC | 0.2 | 200 | 5000 | ◯ | ◯ | ◯ |
| Example 7 | PC | 0.2 | 200 | 10000 | ◯ | ◯ | ◯ |
| Example 8 | PC | 0.2 | 200 | 15000 | ◯ | Δ | ◯ |
| Example 9 | PC | 0.2 | 600 | 5000 | ◯ | ◯ | ◯ |
| Example 10 | PC | 0.2 | 800 | 5000 | ◯ | ◯ | ◯ |
| Example 11 | PET | 0.3 | 200 | 5000 | ◯ | ◯ | ◯ |
| Example 12 | PEN | 0.3 | 200 | 5000 | ◯ | ◯ | ◯ |
| Example 13 | PC | 0.4 | 200 | 5000 | ◯ | ◯ | ◯ |
| Example 14 | PA | 0.8 | 200 | 5000 | Δ | ◯ | ◯ |
| Comparative Example 1 | PP | 0.008 | 200 | 5000 | ◯ | ◯ | X |

TABLE 1-continued

|  | | Base | | Gas barrier layer | | | | |
|---|---|---|---|---|---|---|---|---|
|  | Resin | Moisture content (% by mass) | Film thickness (mm) | Accumulated light amount (mJ/cm$^2$) | Water vapor barrier property | Base deformation | Malodor |
| Comparative Example 2 | PC | 0.009 | 200 | 5000 | ◯ | ◯ | X |
| Comparative Example 3 | PA | 1.4 | 200 | 5000 | X | Δ | ◯ |

PP: polypropylene
PEN: polyethylene naphthalate
PA: polyacrylamide
PC: polycarbonate
PET: polyethylene terephthalate As it is evident from the results of Table 1, it was found that the generation of impurities (ammonia) from the gas barrier film is suppressed when the moisture content of the base is 0.01% by mass or more. It was also found that there is an excellent gas barrier property and the deformation of the base is suppressed when the moisture content of the base is 1% by mass or less.

Manufacture of Simple Liquid Crystal Cell

Manufacture Example 1

On the gas barrier layer of the gas barrier film which has been produced in Example 1, a pixel electrode composed of ITO was formed and a perpendicular polyimide alignment layer was formed on top of the pixel electrode.

Meanwhile, on top of the gas barrier layer of the gas barrier film of Example 1, a common electrode was formed. Then, a perpendicular polyimide alignment layer was formed on top of the common electrode.

Two films obtained from above were oppositely positioned such that the electrode layers (that is, polyimide alignment layers) can face each other. While maintaining a constant space between two substrates by using spacer beads, the periphery was sealed with a sealing agent while having an opening for injecting liquid crystal at proper position. Subsequently, liquid crystal MLC-6610 for VA (manufactured by Merck) was injected via the opening to a space between the polyimide alignment layers. According to sealing of the opening, simple liquid crystal cell 1 was manufactured.

Manufacture Examples 2 to 17

Liquid crystal cells 2 to 17 were manufactured in the same manner as Manufacture Example 1 except that the gas barrier film each produced in Examples 2 to 14 and Comparative Examples 1 to 3 is used instead of the gas barrier film produced in Example 1.

[Evaluation of Liquid Crystal Cell]

The following evaluation was performed for each liquid crystal cells 1 to 17 which has been manufactured in the above.

(Evaluation of Liquid Crystal Operation)

The liquid crystal cell was added to a constant-temperature and constant-humidity bath at 60° C., 90% RH. Two hundred and fifty hours later, density of eluted ions was measured from the current-voltage Lissajous waveform by using an apparatus for measuring ion density of liquid crystal cell (manufactured by Toyo Technica Co., Ltd.). The height of the director peak of the liquid crystal was compared to the height of the peak from the eluted ions, and the liquid crystal operation was evaluated according to the following criteria.

◯: there was almost no influence on operation of the liquid crystal

Δ: it is usable, but there is a possibility of having an influence on operation of the liquid crystal x: there was an influence on operation of the liquid crystal.

The obtained results are listed in Table 2.

(Evaluation of Air Bubbles)

The liquid crystal cell was added to a constant-temperature and constant-humidity bath at 60° C. and 90% RH. Two hundred and fifty hours later, presence or absence of air bubbles in the liquid crystal cell was examined with a naked eye and the liquid crystal operation was evaluated according to the following criteria.

◯: there was no occurrence of air bubbles

Δ: there was an occurrence of air bubbles with diameter of 1 mm or less x: there was an occurrence of air bubbles with diameter of more than 1 mm.

The obtained results are listed in Table 2 below.

TABLE 2

| | | | Base | | Gas barrier layer | | | |
|---|---|---|---|---|---|---|---|---|
| | | Gas barrier film | Resin | Moisture content (% by mass) | Film thickness (mm) | Accumulated light amount (mJ/cm$^2$) | Liquid crystal operation | Air bubbles |
| Liquid crystal cell 1 | Example 1 | PP | 0.012 | 200 | 5000 | ◯ | ◯ |

TABLE 2-continued

| | | Base | | Gas barrier layer | | | |
|---|---|---|---|---|---|---|---|
| | Gas barrier film | Resin | Moisture content (% by mass) | Film thickness (nm) | Accumulated light amount (mJ/cm$^2$) | Liquid crystal operation | Air bubbles |
| Liquid crystal cell 2 | Example 2 | PC | 0.2 | 40 | 5000 | Δ | ○ |
| Liquid crystal cell 3 | Example 3 | PC | 0.2 | 80 | 5000 | ○ | ○ |
| Liquid crystal cell 4 | Example 4 | PC | 0.2 | 200 | 500 | ○ | Δ |
| Liquid crystal cell 5 | Example 5 | PC | 0.2 | 200 | 1000 | ○ | ○ |
| Liquid crystal cell 6 | Example 6 | PC | 0.2 | 200 | 5000 | ○ | ○ |
| Liquid crystal cell 7 | Example 7 | PC | 0.2 | 200 | 10000 | ○ | ○ |
| Liquid crystal cell 8 | Example 8 | PC | 0.2 | 200 | 15000 | ○ | ○ |
| Liquid crystal cell 9 | Example 9 | PC | 0.2 | 600 | 5000 | ○ | ○ |
| Liquid crystal cell 10 | Example 10 | PC | 0.2 | 800 | 5000 | ○ | Δ |
| Liquid crystal cell 11 | Example 11 | PET | 0.3 | 200 | 5000 | ○ | ○ |
| Liquid crystal cell 12 | Example 12 | PEN | 0.3 | 200 | 5000 | ○ | ○ |
| Liquid crystal cell 13 | Example 13 | PC | 0.4 | 200 | 5000 | ○ | ○ |
| Liquid crystal cell 14 | Example 14 | PA | 0.8 | 200 | 5000 | Δ | ○ |
| Liquid crystal cell 15 | Comparative Example 1 | PP | 0.008 | 200 | 5000 | Δ | X |
| Liquid crystal cell 16 | Comparative Example 2 | PC | 0.009 | 200 | 5000 | Δ | X |
| Liquid crystal cell 17 | Comparative Example 3 | PA | 1.4 | 200 | 5000 | X | ○ |

PP: polypropylene
PEN: polyethylene naphthalate
PA: polyacrylamide
PC: polycarbonate
PET: polyethylene terephthalate As it is evident from the results of Table 2, it was found that the generation of air bubbles derived from impurities (mainly, ammonia) is suppressed when the moisture content of the base is 0.01% by mass or more. It was also found that the liquid crystal operation of the liquid crystal cell can be maintained even under high temperature and high humidity conditions when the moisture content of the base is 1% by mass or less.

What is claimed is:

1. A method for producing a gas barrier film having a base and a gas barrier layer being arranged on the base, comprising:
    a step (1) for carrying out at least one process for controlling a moisture content of the base, wherein the process is selected from the group consisting of a process of drying the base, a process of immersing the base in water, and a process of keeping the base in an environment with a pre-determined humidity so that the moisture content of the base becomes 0.01 to 0.8% by mass,
    wherein the base is a resin film of polycarbonate (PC), polypropylene (PP), polyacrylamide (PA), polyethylene terephthalate (PET), polybutylene terephthalate (PBT), or polyethylene naphthalate (PEN);
    a step (2) for obtaining a coating film by coating a coating liquid containing polysilazane onto the base; and
    a step (3) for forming a gas barrier layer by irradiating the coating film with vacuum ultraviolet rays,
    wherein a film thickness of the gas barrier layer is 50 to 800 nm, and an accumulated light amount of the vacuum ultraviolet rays is 1000 to 10000 mJ/cm$^2$.

2. The method according to claim 1, wherein the base has a linear expansion coefficient of 50 ppm/° C. or less.

3. The method according to claim 1, wherein the base has a linear expansion coefficient of 1 to 50 ppm/° C.

4. The method according to claim 1, wherein the base has 10-point average surface roughness Rz of 1 to 1500 nm.

5. The method according to claim 1, wherein the base has a moisture content of 0.01 to 0.5% by mass.

6. The method according to claim 1, wherein the base has a moisture content of 0.01 to 0.3% by mass.

7. The method according to claim 1, wherein the gas barrier film comprises an anchor coat layer between the base and the gas barrier layer.

8. The method according to claim 7, wherein the anchor coat layer comprises at least one anchor coat agent selected from polyester resins, isocyanate resins, urethane resins, acrylic resins, ethylene vinyl alcohol resins, modified vinyl resins, epoxy resins, modified styrene resins, modified silicone resins, and alkyl titanate.

9. The method according to claim 1, wherein the gas harrier film comprises a smooth layer between the base and the gas harrier layer.

10. The method according to claim 1, wherein in the step (3) for forming the gas barrier layer, the irradiation of the coating film with the vacuum ultraviolet rays is performed in an atmosphere containing oxygen.

11. The method according to claim 1, wherein in the step (3) for forming the gas barrier layer, the irradiation of the coating film with the vacuum ultraviolet rays is performed in an atmosphere having an oxygen concentration of 300 to 10000 ppm.

12. The method according to claim 1, further comprising a step (4) for forming a protective layer on the gas barrier layer.

13. The method according to claim 12, wherein the step (4) is a step for obtaining the protective layer by coating a coating liquid containing polysiloxane on the as barrier film obtained in the step (3).

14. The method according to claim 1, wherein the gas barrier film has a plurality of the gas barrier layers.

15. The method according to claim 1, wherein the moisture content of the base becomes 0.03 to 0.8% by mass in the step (1).

16. The method according to claim 1, wherein the process in the step (1) is the process of immersing the base in water or the process of keeping the base in the environment with the pre-determined humidity.

* * * * *